United States Patent [19]

Lewis et al.

[11] 4,293,097
[45] * Oct. 6, 1981

[54] METHOD FOR BRIGHTENING NATURAL CALCITIC ORES

[75] Inventors: Herbert I. Lewis, Wrens; Anthony D. McConnell, Sandersville, both of Ga.; William M. Price, St. Austell, England

[73] Assignee: Anglo-American Clays Corporation, Sandersville, Ga.

[*] Notice: The portion of the term of this patent subsequent to Aug. 28, 1996, has been disclaimed.

[21] Appl. No.: 26,362

[22] Filed: Apr. 2, 1979

Related U.S. Application Data

[63] Continuation-in-part of Ser. No. 868,392, Jan. 10, 1978, Pat. No. 4,165,840, and Ser. No. 892,931, Aug. 3, 1978, abandoned.

[51] Int. Cl.$^3$ .............. B02C 23/18; B02C 23/36; B02C 23/38
[52] U.S. Cl. .................. 241/16; 241/20; 241/29
[58] Field of Search .............. 241/16, 20, 24, 29

[56] References Cited

U.S. PATENT DOCUMENTS

| | | | |
|---|---|---|---|
| 3,512,722 | 5/1970 | Hall | 241/24 |
| 3,604,634 | 9/1971 | Windle | 241/16 |
| 3,661,610 | 5/1972 | Ferris | 106/306 |
| 3,674,529 | 7/1972 | Toms | 106/306 |
| 3,980,240 | 9/1976 | Nott | 241/20 |
| 3,990,966 | 11/1976 | Stanley et al. | 209/12 |
| 4,165,840 | 8/1979 | Lewis et al. | 241/29 X |

Primary Examiner—Richard B. Lazarus
Attorney, Agent, or Firm—Weingram & Klauber

[57] ABSTRACT

A method is disclosed for processing a natural calcitic ore to yield a finely divided calcium carbonate particulate of very high brightness characteristics. The natural calcitic ore is initially coarse-milled to produce a product wherein no more than 5% by weight of the particulate is +325 mesh, and no more than 35% by weight of the particles are of less than 2 microns E.S.D. This coarse-milled product is then subjected as an aqueous slurry containing less than 40% and preferably less than 30% solids by weight, to a froth flotation, which separates with the froth the relatively coarse colorbodies liberated in the initial grinding. Preferable compositions for use in the froth flotation comprise 1-substituted-2-alkyl imidazolines or the salt derivatives thereof, with such compounds being utilized in admixture with a substantially non-polar aliphatic compound having from 10 to 20 carbon atoms in its longest straight chain. The purified underflow from the flotation step is dewatered to at least 60% solids by weight, and is wet-milled, as for example in a sand mill, to yield an output product wherein at least 80% by weight of the resultant particulate has an E.S.D. of less than 2 microns, the product being further characterized by a brightness of at least 95 on the G.E. scale.

17 Claims, No Drawings

METHOD FOR BRIGHTENING NATURAL CALCITIC ORES

BACKGROUND OF INVENTION

This application is a continuation-in-part of our copending applications, Ser. No. 868,392, filed Jan. 10, 1978 (Now U.S. Pat. No. 4,165,840), and Ser. No. 892,931, filed Aug. 3, 1978 now abandoned, each being entitled "METHOD FOR BRIGHTENING NATURAL CALCITIC ORES", which applications are assigned to the assignee of the present application.

This invention relates generally to pigments and more specifically relates to a process for producing high brightness pigments by beneficiation of naturally occurring calcium carbonate.

Calcium carbonate pigments find application in a wide variety of industrial and other environments. Such pigments, for example, are widely utilized as fillers in the manufacture of papers, rubber and various plastics, and as extenders in paint formulations. Such pigments furthermore, either alone or in combination with other pigments, are widely utilized for paper coating applications. In many of the aforementioned applications, particularly e.g. where the pigments are used for coating, it is desirable that the calcium carbonate be as bright as possible.

High brightness calcium carbonate pigments have long been produced by chemical processes, pursuant to which the said carbonates are prepared as precipitates. These processes, however, are comparatively complex and are not well suited to large scale or low cost operations. Interest for such reason has long centered upon possible use of naturally occurring calcium carbonate, particularly in that natural calcitic minerals are extremely abundant in virtually all parts of the world; and, therefore, represent a ready source of inexpensive raw material. In practice, however, it is found that many of the natural calcitic deposits are so highly contaminated with discolorants, that when comminuted in their natural state they are simply inacceptable as pigments. Thus in typical instances deposits which are primarily of calcite may be contaminated with pyrites and with mica, both of which in varying degrees contribute to the discoloration of the otherwise relatively colorless calcium carbonate.

Various proposals have from time to time been advanced for processes directed at improving the brightness of the aforementioned naturally occurring calcium carbonates. Many of these prior proposals involve the use of flotation methods to remove impurities from calcitic ores. The bulk of such prior art, however, is centered upon the removal of siliceous impurities, so as to improve the remaining composition for use in cement manufacture.

In some instances too, flotation is recommended for improving the brightness characteristics of naturally occurring calcium carbonate. Thus, in U.S. Pat. No. 3,512,722, a wet-ground natural calcium carbonate is subjected to a flotation, after which the underflow is classified, partially dewatered, dried, and pulverized to reduce the agglomerates and larger particles.

Similarly, in U.S. Pat. No. 3,990,966 a process is disclosed for purifying calcite ore containing pyrite impurities, which process utilize a flotation step employing certain cationic surfactants. Such surfactants are selected from the group consisting of 1-hydroxyethyl-2-heptadecenyl glyoxalidine and 1-hydroxyethyl-2-alkylimidazolines and salt derivatives thereof, wherein the alkyl portion of the imidazoline is the alkyl portion of a fatty acid. The separated calcite is classified, settled in a thickener in the presence of a settling agent and dried.

Additionally prior art pertinent to processes for brightening natural calcitic ores, is also cited in U.S. Pat. No. 3,980,240, which patent is assigned to the assignee of the present application. The method disclosed in that patent is thus concerned with brightening of a natural calcitic ore by crushing and forming same into an aqueous slurry, coarse-milling the slurry, fine milling the slurry to alter the particulate such that at least 70% of the particles are less than 2 microns, and then subjecting this fine-milled particulate to a separation by application of a high intensity magnetic field and/or by use of flotation.

Except for the aforementioned 3,980,240 patent, the techniques of the prior art as discussed above, have in general been of limited efficacy in producing high brightness calcium carbonate pigments from highly contaminated natural sources. Thus, for example, while the flotation techniques of the aforementioned 3,990,966 patent can produce a product of 95+ brightness, consideration of the pertinent disclosure will establish that such results are achieved utilizing a stock feed which is well over 94 brightness to begin with. Indeed, in most instances where pigments are derived on a commercial scale from such natural sources, an ore is utilized which to begin with is of very high purity and relatively free from discoloring contaminants. Reference may be had in this connection, for example, to U.S. Pat. Nos. 3,661,610 and 3,674,529, which cite the use of calcium carbonate pigments derived from a raw, high purity natural chalk whiting. The natural whiting is subjected to a two-stage grinding process, it not being necessary in these instances to subject the product of purification, i.e. separation steps.

While the processes of the aforementioned 3,980,240 patent are in general most effective, it is yet found that certain disadvantages occur where one seeks to beneficiate the finely ground carbonate, i.e. the output from the second, fine grinding stage. Since, in particular, such beneficiation steps are normally carried out at relatively low solids (typically less than 50% by weight solids), problems can develop in the subsequent step of removing water from the slurry. In particular, it is found to be quite difficult to dewater slurries of fine ground carbonates (e.g. where the particulate is such that 80% or more by weight of the particles are less than 2 microns) to achieve a solids content at which such slurry can be commercially shipped—i.e. preferably greater than 70% solids. Furthermore, as will be considered further hereinbelow, it is found that when grinding is carried out to a very fine degree, i.e. when the particulates are reduced to a very fine stage of comminution prior to separation, the colorbodies in consequence are so thoroughly and evenly distributed throughout the material from which they are sought to be removed, that the efficacy of flotation is to a degree impeded, and the recovery of saleable product from the flotation step is much reduced.

In accordance with the foregoing, it may be regarded as an object of the present invention, to provide a process which enables the production of high quality bright calcium carbonate pigments from naturally occurring calcitic ores containing relatively high levels of discoloring contaminants.

It is a further object of the present invention, to provide a process for purifying and brightening natural calcitic ores of relatively high discoloration, to yield a slurried pumpable product of high solids content, wherein the slurried carbonate includes at least 80% by weight of particles less than 2 microns E.S.D., and wherein the resultant product brightness is at least 95 on the G.E. scale.

It is a still further object of the present invention, to provide a process meeting the foregoing objectives, which, further, enables beneficiation without adverse effects upon the subsequent dewatering operations which are deemed desirable to produce a product in a commercially advantageous form.

SUMMARY OF INVENTION

Now in accordance with the present invention, the foregoing objects, and others as will become apparent in the course of the ensuing specification, are achieved by a method pursuant to which the natural calcitic ore is initially coarse-milled to produce a product wherein no more than 5% by weight of the particulate is +325 mesh, and no more than 35% by weight of the particles are of less than 2 microns E.S.D. This coarse-milled product is then subjected as an aqueous slurry preferably including less than 40% and preferably less than 30% solids, to a froth flotation, which separates with the froth the relatively coarse colorbodies liberated in the initial grinding. The purified underflow is then dewatered to at least 60% and preferably over 65% solids by weight, and is wet-milled, preferably in a sand mill, to yield an output product wherein at least 80% by weight of the resultant particulate has an E.S.D. of less than 2 microns, the product being further characterized by a brightness of at least 95 on the G.E. scale, and an abrasion less than 25 mg. as measured by the Valley Abrasion Test (carried out using Procedure 65 prescribed by the Institute of Paper Chemistry).

Preferable compositions for use as collectors in the froth flotation comprise 1-substituted-2-alkyl imidazolines or the salt derivatives thereof, with such compounds being utilized in admixture with a substantially non-polar aliphatic organic compounds, such as an aliphatic hydrocarbon—which latter material is hypothesized to function as a promoter.

Aspects of certain of the flotation collector agents described above are disclosed in the aforementioned U.S. Pat. No. 3,990,966. Preferred starting materials in the present invention are the 1-substituted-2-alkyl imidazolines, wherein the alkyl portion is the alkyl portion of a fatty acid having a carbon chain length of between 10 and 20 carbon atoms. The starting materials which we have found yield especially good results are alkyl imidazolines in which the alkyl portion is the alkyl portion of oleic acid or tall oil. Compounds of this type wherein the 1-substituent is an hydroxyethyl group are commercially available under the respective trade names Monazoline O and Monazoline T (Mona Industries Inc., Paterson, N.J.). Similarly, compounds of this type wherein the 1-substituent is an aminoethyl group, are available commercially from Finetex, Inc. of Elmwood Park, N.J., under the trade name Finazoline O. The compounds are readily converted to salts by the addition of the appropriate acid in the necessary quantity. Thus the Monazoline O Acetate referred to in the subsequent Examples herein, is the acetate salt of the 1-hydroxyethyl-2-oleylimidazoline referred to above.

We have thus discovered that the foregoing flotation agents, preferably the salts thereof, and particularly the acetate salts of the above compounds, when used in combination with the aforementioned non-polar organic compounds, are remarkably effective in removing insoluble mineral impurities from natural calcitic ores.

Preferable non-polar aliphatic compounds for use as promoters have from 10-20 carbon atoms in the longest straight chain portion thereof; and more preferably are hydrocarbons of the indicated chain length. The hydrocarbon may be a mixture of compounds of the correct chain length, the commonest and cheapest being kerosene or fuel oil. We especially prefer to use a highly refined material which is essentially similar to kerosene, but has had substantially all the aromatic or cyclic compounds removed by chemical means. A composition of this type, is e.g. available under the name 2251 oil (Penreco Division of Pennzoil Co., Butler, PA). These materials are advantageous because of their effectiveness and low toxicity. The process of the present invention does not necessarily require, however, that aliphatic paraffins (alkanes) be employed. Other non-polar aliphatic compounds of similar carbon chain length, such as alcohols or fatty acid esters can also be employed.

The product yielded by practice of the present invention is found to be especially well-suited to paper coating applications. In such environment the product has a significantly less detrimental effect on ink absorbency than does precipitated carbonates; and the product, further, has a less detrimental effect on gloss of coated papers than does conventional ground carbonates.

DESCRIPTION OF PREFERRED EMBODIMENT

In order to demonostrate the efficacy of the present inventive process a series of Examples illustrative thereof will now be set forth.

EXAMPLE I

In these Examples samples of various calcite deposits were utilized, which samples were of high calcium content, and included as impurities (among other elements) fine quartz, sand, mica and quantities of fine pyrites.

In the present Example, a natural calcite sample derived from Phillipsburg, Quebec, and of constitution in accordance with the preceding paragraph, was subjected to a preliminary crushing by a press, and thence was further crushed by a use of a cone crusher. The sample was then wet ground by use of a ball mill at 65% solids to provide a particulate such that 28% by weight of the particles thereof were of less than 2 microns in size and no more than 2% by weight were larger than 325 mesh. Dispex N40 (trademark of Allied Colloids, Great Britain, for a sodium polyacrylate composition) was used during ball milling as a dispersant at a concentration of 9 lbs/ton solids—in order to facilitate grinding.

The brightness of the ore at this point was measured at 93.6 on the G.E. scale. In all instances in this specification it will be understood that brightness values are obtained according to the standard specification established by TAPPI procedure T-646m-54.

EXAMPLE II

The material from Example I, which at this point was in slurry form (65% solids), was diluted to 25% solids, and was subjected to a froth flotation using a combination of kerosene (0.15 lbs/ton) and a xanthate (Dow Z-3 at concentration of 0.1 lb/ton) as collectors. Pine Oil (0.1 lb/ton) and Aerofroth 77 (0.16 lb/ton) were used as frothers. (Aerofroth is a trademark of American Cyanamid for straight-chain higher alcohol compositions). The pH during the flotation treatment was approximately 9.5. The resultant purified product displayed a G.E. brightness of 94.5.

EXAMPLE III

The unbeneficiated material used as the input material for Example I was finely ground by wet-milling same at 70% solids in a sand mill utilizing Ottawa sand as a grinding media. An additional 9 lb/ton of Dispex was used to facilitate grinding. (Dispex at the indicated concentration was used in all ensuing Examples where sand grinding was effected.) The milling was continued to a point such that 96% by weight of the particles thereof had an E.S.D. less than 2 microns. The brightness of the material was evaluated and found to have dropped from the 93.6 noted in Example I to 93.2.

EXAMPLE IV

The floated carbonate material from Example II was flocced with 7 lbs/ton calcium carbonate and filtered to 70% solids, then subjected to fine grinding by wet-milling the previously coarse-milled product from Ottawa sand—as in Example III. This fine grinding was effected at 70% solids, and for a time duration sufficient to reduce the particulate such that 95% of the particles had an equivalent spherical diameter (E.S.D.) of less than 2 microns. The floated sandground product was then found to display a G.E. brightness of 95.8.

In comparing the brightness yielded in Example III with that yielded in Example IV, i.e. 93.2 vs. 95.8, it will be seen that a difference has resulted which is comparatively enormous. Of equal significance is the fact noted in Example III, that the brightness found therein, had actually dropped in consequence of the fine grinding operation. It is believed that this last result is explained by the hypothesis that the relatively coarse colorbodies liberated in the initial grinding stage have a limited effect upon brightness measurement when discretely distributed in the material. However, after further grinding to a very fine state of comminution, the colorbodies are more evenly distributed—with a resultant, disproportionate effect on brightness.

Using the process of Windle, U.S. Pat. No. 3,604,634 (Example III), the particle size is reduced to that of interest for the present invention; however, the brightness of the original material (Example I) is seen to drop from 93.6 to 93.2 as a result of fine grinding.

On the other hand, flotation of the Example I material, as in Example II, yields only a minor improvement in brightness (of 0.9 units). In the present invention, however, quite unexpectedly, the specific combination and sequence of flotation and fine grinding utilized results in a product having the desired size characteristics (as in Windle), and with a brightness increase exceeding those yielded by the techniques of Examples II and III.

It will thus be evident that a synergistic phenomenon is occurring in the present invention. In particular, if we regard the brightness increase arising from fine grinding to be X units (where X may be positive or negative), that arising from flotation to be Y units, and the brightness increase yielded by the present invention to be Z units; then it is readily evident that Z is greater than the sum of X and Y.

The initial coarse grinding operation carried out in accordance with the present invention may be effected by various techniques known in the art as, for example, by means of wet ball milling or by wet autogeneous grinding; or by dry grinding. The fine grinding step is preferably effected (as in Example IV) by sand grinding, i.e. by grinding with a particulate grinding material consisting of particles which usually range in size from about 150 microns to ¼" in diameter, and preferably from about 500 microns to about 2 mm. Details of the sand grinding operation, including citation of equivalent materials for use in said grinding, are set forth in U.S. Pat. No. 3,604,634 to William Windle; and the conditions of grinding as set forth in that patent may be regarded as the preferable mode of operation with respect to the present invention. The fine grinding step has as its objective yielding an output product wherein at least 80% by weight of the resulting particulate has an E.S.D. of less than 2 microns, the product being further characterized by a brightness of at least 95 on the G.E. scale.

The froth flotation conducted pursuant to the invention is carried out with the slurry having a solids content of less than 40%, and preferably less than 30%. Useful collector agents for the present process include (in addition to the preferred agents which will be discussed in Example IX et seq.), xanthates such as potassium ethyl xanthate (Dow C-2), at typical concentrations of 0.1 lb/ton solid; amines and their salt derivatives are also well known as useful cationic collectors, and may be employed in the present process. Similarly, frothers such as pine oil, cresylic acid, polypropylene glycol ether or other well known agents of this type may be utilized.

In the said dewatering operations—which are carried out upon the underflow following the froth flotation—the product is dewatered to at least 60% solids by weight, and preferably over 65% solids. Dewatering can be accomplished by conventional devices known in the art, including by the use of rotary vacuum filters, or through suitable centrifuges.

EXAMPLE V

In this Example, a sample of a course (+100 mesh) calcitic ore from a Maryland deposit was utilized. The sample was ball milled, using 9 lb/ton Dispex at 65% solids to give 2% greater than 325 mesh and 17% less than 2 microns E.S.D. (all by weight). At this stage, the brightness was 90.1. When the product was sand ground (with addition of 9 lbs/ton Dispex) the brightness dropped to 88.7.

When the coarse ground material was floated at 25% solids using 1 lb/ton Armeen C, the brightness increased to 94.4 ("Armeen C" is a trademark of Armak Co. for a monoamine). The floated product was then dewatered, flocculated (flocced with 7 lbs/ton $CaCl_2$ and filtered), and sand ground at 70% solids with 9 lbs/ton Dispex. The brightness increased to 95.8.

In both of the above instances the sand ground product included by weight 90% less than 2 microns E.S.D. The brightness differential was 7.1 units.

EXAMPLE VI

In this Example a sample of a calcitic ore from a Maryland deposit was utilized, which was initially dry ground and classified to yield a product wherein 1% by weight of the particles were greater than 325 mesh and 15% by weight were less than 2 microns, with the sample having an initial brightness of 92.6. This sample was slurried to 67% solids and sand ground to 90% less than 2 microns using 9 lbs/ton Dispex. The brightness in consequence dropped to 90.5.

The same dry ground material was diluted to 25% solids and floated using 1 lb/ton of Armac C and 9 lbs/ton Dispex as flotation reagents (pH was 9). The floated brightness was found to be 93.6. ("Armac C" is a trademark of Armak Co. for acetic acid salts of the n-alkyl amines).

The floated product from the above procedure was dewatered using 7 lbs/ton CaCl₂ and was sand ground to 90% less than 2 microns at 67% solids using 9 lbs/ton Dispex. The final brightness was 94.0. The brightness differential as between the floated and the unfloated sand ground products was 3.5 units.

EXAMPLE VII

A further sample of a calcitic ore from Maryland deposit was dry ground and classified to yield an initial feedstock wherein 2% by weight of the particles were greater than 325 mesh and 18% by weight were less than 2 microns. The brightness of this feedstock was initially determined to be 90.7. The sample was sand ground using 9 lbs/ton Dispex to 90% less than 2 microns, whereupon the brightness was found to have dropped to 90.3. It may be noted both in connection with this Example and the preceding Example VI that certain advantages accrue by virtue of the dry grinding procedure which produces the initial feedstock. In particular no dispersants are used in these early grinding stages, which dispersants might otherwise have to be counteracted by later use of flocculants.

When the feedstock used in this Example was diluted to 25% solids and floated using 12 lbs/ton Kerosene and 2 lbs/ton Duomac T (trademark of Armak Co. for N-tallow trimethylene diamine diacetate) as collectors; and 0.2 lb/ton Igepal CO710—trademark of GAF Corporation for nonylphenoxypoly (ethyleneoxy) ethanol—and 0.1 lb/ton Triton CF10 (trademark Rohm & Haas for alkyl laryl polyether) as frothers and at a pH of 8-9, the brightness had improved to 92.2.

In this Example the flotation product was dewatered in a Buchner filter without the use of CaCl₂ as flocculant and was then sand ground (with 9 lb/ton Dispex) to 90% less than 2 microns. The final brightness was found to be 95.2.

From the foregoing it will be seen that the differential in brightness as between the floated and unfloated sand ground products was 4.9 units.

EXAMPLE VIII

The present Example was similar to Example VII above, except in this instance, the flotation, dewatering, and grinding steps were carried out in a large pilot plant scale. Thus, dewatering was carried out in a Bird centrifuge rather than in a lab filter. The feed material was of the general type described in connection with the two preceding Examples, and included 15% by weight of particles less than 2 microns. The flotation reagents utilized were as follows:

| | |
|---|---|
| 1.0 lb/ton | Duomac T |
| 0.25 lb/ton | Igepal CO710 |
| 0.15 lb/ton | Triton CF10 |
| 12.0 lb/ton | Kerosene |

The brightness determined for the original feedstock was 90.4; the brightness of the sand ground product was 90.5; the brightness of the floated product was 93.5; and that of the floated, dewatered, and sand ground product was 96.2. In all instances, the treating sequences are as described in the preceding Examples. It will especially be noted that the brightness differential as between the floated and unfloated sand ground products was 5.7 units.

EXAMPLE IX

In this Example a Maryland calcitic ore similar to that used in Example V through VII was treated. Such ore has been found to contain the following impurities: orthoclase (potassium feldspar), quartz, tremolite, phlogopite mica, and pyrite, the total amount of these impurities being generally between 1½ and 5% by weight of the calcitic ore.

Samples of the foregoing ore were dry ground and classified to yield feedstocks wherein 0.5% by weight of the particles were +325 mesh and 22% by weight were less than 2 microns. These samples were slurried to 25% solids and floated utilizing various combinations of flotation reagents, including the previously discussed 1-hydroxyethyl-2-alkyl imidazoline salts in combination with alphatic hydrocarbons. In a typical procedure the collector (and, as appropriate frother) are added to the slurry at the start of the flotation process. Approximately one-third of the hydrocarbon promoter is also added at the start of the float, and the remaining two-thirds are added incrementally—e.g. with a typical 45 minute flotation, 2 lbs/ton of promoter may be added at the start of flotation, with 1-2 lbs/ton being added in increments at 5-10 minute intervals.

The floated products were dewatered using 7 lbs/ton CaCl₂ and then sand ground to 90% less than 2 microns at 70% solids using 9 lbs/ton Dispex—after which brightnesses were determined. Floated brightnesses (prior to sand grinding) were also measured; and acid insolubles were determined for the sample both as feedstock and following flotation. Results yielded by these procedures are set further in Table I below:

TABLE I

| Sample No. | 1 | 2 | 3 | 4 | 5 | 6 |
|---|---|---|---|---|---|---|
| Feed Brightness | 90.7 | 90.5 | 90.6 | 93.2 | 93.3 | 93.3 |
| Feed % Insoluble | 3.2 | 2.26 | 2.24 | 2.6 | 2.03 | 1.36 |
| Collector & Dose (lbs/ton) | 2 Duomac T | 2 MTA* | 2 MOA** | 1 Duomac T | 1.75 MOA** | 2 MOA** |
| Frother & Dose (lbs/ton) | 0.2 Igepal CO710 0.1 Triton CF10 | — | — | 0.2 Igepal CO710 0.1 Triton CF10 | — | — |
| Promoter & Dose (lbs/ton) | 10 kerosene | 5 kerosene | 6 kerosene | 8 kerosene | 5 2251 Oil | 6 kerosene |
| Floated Brightness | 92.2 | 93.8 | 93.3 | 94.5 | 95.3 | 95.0 |
| Floated % Insoluble | 0.3 | 0.04 | 0.18 | 0.77 | 0.10 | 0.09 |
| Flotation Recovery % | 76 | 86 | 89 | 76 | 94 | 89 |

TABLE I-continued

| Sample No. | 1 | 2 | 3 | 4 | 5 | 6 |
|---|---|---|---|---|---|---|
| Sand Ground Brightness | 95.2 | 95.4 | 96.3 | 95.8 | 96.3 | 97.0 |

*Monazoline T Acetate
**Monazoline O Acetate

Because the materials floated in this Example are of relatively fine particle size and contain such a variety of mineral impurities—which fortunately will all respond to cationic flotation—the selection of a suitable cationic collector is difficult. The mechanism of attachment of the collector to the mineral impurity is by electrostatic attraction of the cationic polar group of the collector to the negatively charged surface of the mineral. This is a comparatively weak mechanism compared to the adsorption or chemisorption mechanism which takes place in the flotation of, for example, sulphides with xanthates.

It is therefore essential to use a collector having a strongly charged cationic polar group to ensure maximum attraction to the mineral. In this case, coating of the mineral by the collector would become almost impossible at reasonable collector concentrations because of the the high surface area of the minerals to be floated. It is hypothesized that the function of the non-polar hydrocarbon is to combine with the collector to participate in the formation of a sufficiently extensive coating of hydrophobic material to allow bubble attachment and hence flotation to take place.

It will be noted from Table I that in the case of the carbonates considered, the lower the acid insoluble content of the material after flotation, the higher the sand ground brightness of the finished slurry. Brightnesses of the finished products are seen in all instances to be well over 95; and it will e.g. be noted that where the feedstock is of relatively low contamination—as measured by acid insolubles—then extremely high brightnesses are obtained. Thus in the instances of Samples 5 and 6, which contained respectively 2.03% and 1.36% by weight of acid insolubles, final product brightnesses of 96.3 and 97.0 were yielded.

In Table I, Samples 1 and 4 have been used as references to illustrate the superiority of the imidazoline/hydrocarbon combination over a Duomac T/frother/kerosene system. It can be seen that using either low or high brightness feed materials the imidazoline system produces higher floated brightness, lower levels of acid insoluble residue, and higher sand ground brightness. In addition substantially higher recovery is achieved, no separate frothing compound is required, and dosages of kerosene or other neutral hydrocarbons are reduced.

Pursuant to the invention, the aforementioned imidazoline salts are added to the slurried ore in preferable concentrations of from 1 to 5 lbs/ton of the calcitic ore, in combination with the addition of the non-polar hydrocarbon in concentrations of from 3 to 15 lbs/ton of ore.

EXAMPLE X

In this Example a further Maryland calcitic ore similar to those of Examples V, VI, VII, and IX, was treated. The said ore was thus initially dry ground and classified to yield a feed material wherein 99% by weight of the particles were −325 mesh, 25% by weight were less than 2 microns E.S.D. (equivalent spherical diameter). The feed material had an initial brightness of 92.4 and included 3.0% of acid insolubles. When a portion of this feed material was slurried to 67% solids and sand ground to 90-92% less than 2 microns, the brightness dropped to 91.9.

The same dry ground material was diluted to 25% solids and floated utilizing various combinations of collector and promoters. The collector and frother (if any) were added to the slurry in a single dose at the start of the flotation process. The promoter, when used, was added as roughly one-third of the total quantity at the start of the float and the remaining two-thirds in ½ lbs/ton increments at 5-10 minute intervals—the total time for flotation being for all samples approximately 45 minutes.

The floated products of the foregoing procedures, were dewatered and then sand ground—by the procedures described in Example IX. Floated brightness (prior to sand grinding) were measured, acid insolubles and flotation recoveries were determined; and the brightness of the floated samples after sand grinding (by the procedures of Example IX) were measured. Results yielded by these procedures are set forth in Table II below:

TABLE II

| Flotation Chemicals & Dose Rates lbs/ton | Floated Brightness G.E. | Floated % Insolubles | Flotation Recovery % | Sand Ground Brightness G.E. |
|---|---|---|---|---|
| 2.0 lb/ton Monazoline O | 93.1 | 2.0 | <60 | 92.0 |
| 2.0 lb/ton Monazoline O Acetate | 92.8 | 0.65 | <60 | 94.2 |
| 2.0 lb/ton Monazoline O 9.0 lb/ton Penreco 2251 oil | 94.9 | 0.4 | 86 | 95.0 |
| 2.0 lb/ton Monazoline O Acetate 6.0 lb/ton Penreco 2251 oil | 94.8 | 0.16 | 83 | 96.6 |

EXAMPLE XI

In this Example a further Maryland calcitic ore similar to those of Examples V, VI, VII, IX, and X, was treated. The said ore was thus initially dry ground and classified to yield a feed material wherein 99% by weight of the particles were −325 mesh, 25% by weight were less than 2 microns E.S.D. (equivalent sperical diameter). The feed material had an initial brightness of 92.6 and included 2.07% of acid insolubles.

The same dry ground material was diluted to 25% solids and floated utilizing various further combinations of collector and promoters. The collector and frother (if any) were added to the slurry in a single dose at the start of the flotation process. The promoter was added as roughly one-third of the total quantity at the start of the float and the remaining two-thirds in ½ lbs/ton increments at 5-10 minute intervals—the total time for flotation being for all sample approximately 45 minutes.

The floated products of the foregoing procedures, were dewatered and then sand ground—by the procedures described in Example IX. Floated brightness (prior to sand grinding) were measured, acid insolubles and flotation recoveries were determined; and the brightness of the floated samples after sand grinding (by the procedures of Example IX) were measured. Results yielded by these procedures are set forth in Table III below:

TABLE III

| Flotation Chemicals & Dose Rates lbs/ton | Floated Brightness G.E. | Floated % Insolubles | Flotation Recovery % | Sand Ground Brightness G.E. |
|---|---|---|---|---|
| 2.0 lb/ton Monazoline 0 Acetate 10.0 lb/ton 2251 oil | 93.8 | 0.31 | 85 | 96.4 |
| 2.0 lb/ton Finazoline 0 Acetate* 18.0 lb/ton 2251 oil | 93.6 | 0.31 | 85 | 96.0 |

*Finazoline 0 (Finetex, Inc., Elmwood Park, N.J.) was converted to the acetate salt by addition of 60 parts by weight of glacial acetic acid to 344 parts by weight of Finazoline 0.

It will be evident from Tables II and III that the procedures of the present invention result in a product which in all instances displays a brightness of at least 95. The assembled data further illustrates the superior results yielded by use of the imidazoline salt derivatives (vis-a-vis the imidazoline); and most especially does such data illustrate the striking brightness improvements yielded by combined use of such salt derivatives with the previously specified non-polar aliphatic hydrocarbons. Note should be taken, as well, of the equally striking reduction in acid insolubles achieved by practice of the present invention.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

We claim:

1. A method for processing a natural calcitic ore to yield a finely divided calcium carbonate particulate of relatively very high brightness characteristics, comprising in sequence the steps of:
   coarse-milling said natural calcitic ores to produce a coarse-milled product;
   subjecting said coarse-milled product as an aqueous slurry including less than 40% solids to a froth flotation, and separating with the froth discoloring contaminants;
   dewatering the underflow product from said froth flotation to at least 60% solids by weight; and
   wet-milling the dewatered product to yield an output product wherein at least 80% by weight of the resultant particulate has an E.S.D. of less than 2 microns;
   said flotation step being conducted utilizing as a collector agent a 1-substituted-2-alkyl imidazoline or salt derivative thereof; and said collector agent being employed in conjunction with a promoter comprising a substantially nonpolar aliphatic compound having from 10 to 20 carbon atoms in its longest straight chain.

2. A method in accordance with claim 1, wherein said froth flotation is conducted with said slurry including less than 30% solids.

3. A method in accordance with claim 2, wherein said promoter is a hydrocarbon.

4. A method in accordance with claim 3, wherein said collector agent comprises a 1-hydroxyethyl-2-alkylimidazoline or salt derivative thereof.

5. A method in accordance with claim 3, wherein said collector agent comprises a 1-aminoethyl-2-alkylimidazoline or salt derivative thereof.

6. A method in accordance with claim 3, wherein said collector comprises a said salt derivative.

7. A method in accordance with claim 6, wherein said salt derivative comprises an acetate.

8. A method in accordance with claim 3, wherein said output product is further characterized by a brightness of at least 95 on the G.E. scale.

9. A method in accordance with claim 3, wherein said salt is utilized in concentrations of from about 1 to 5 lbs/ton of calcitic ore, and said neutral hydrocarbon in concentrations of from about 3 to 15 lbs/ton of said ore.

10. A method in accordance with claim 3, wherein said hydrocarbon comprises kerosene.

11. A method in accordance with claim 10, wherein said kerosene has been purified by separation therefrom of aromatic and cyclic compounds.

12. A method in accordance with claim 3, wherein the alkyl portion of said alkylimidazoline is the alkyl portion of oleic acid or tall oil.

13. A method in accordance with claim 3, wherein said coarse-milling effects reduction of said natural calcitic ore such that no more than 5% by weight of the particles thereof are +325 mesh, and no more than 35% are of less than 2 microns E.S.D.

14. A method in accordance with claim 13, wherein said wet-milling is effected by sand grinding.

15. A method in accordance with claim 13, wherein said froth flotation product is dewatered to over 65% solids.

16. A method in accordance with claim 2, wherein said coarse-milling is effected by dry grinding.

17. A method in accordance with claim 2, wherein said salt derivative is an acetate.

* * * * *